(12) United States Patent
McNitt

(10) Patent No.: US 7,283,647 B2
(45) Date of Patent: Oct. 16, 2007

(54) METHOD AND SYSTEM FOR PHYSICAL MOTION ANALYSIS AND TRAINING OF A GOLF CLUB SWING MOTION USING IMAGE ANALYSIS TECHNIQUES

(76) Inventor: Michael J. McNitt, 9646 S. Promenade Pl., Highlands Ranch, CO (US) 80126

( * ) Notice: Subject to any disclaimer, the term of this patent is extended or adjusted under 35 U.S.C. 154(b) by 841 days.

(21) Appl. No.: 10/620,677

(22) Filed: Jul. 16, 2003

(65) Prior Publication Data

US 2005/0013467 A1 Jan. 20, 2005

(51) Int. Cl.
*A63B 69/36* (2006.01)
*G06K 9/00* (2006.01)

(52) U.S. Cl. .................. 382/107; 473/240
(58) Field of Classification Search ............. 473/151; 382/107
See application file for complete search history.

(56) References Cited

U.S. PATENT DOCUMENTS

| | | | |
|---|---|---|---|
| 4,137,566 A * | 1/1979 | Haas et al. .................. 473/209 |
| 5,413,345 A | 5/1995 | Nauck | |
| 5,527,041 A * | 6/1996 | Terry et al. ................. 473/150 |
| 5,772,522 A * | 6/1998 | Nesbit et al. ............... 473/222 |
| 5,792,001 A | 8/1998 | Henwood | |
| 5,935,014 A | 8/1999 | Lindsay | |
| 6,126,449 A | 10/2000 | Burns | |
| 6,227,984 B1 * | 5/2001 | Blankenship ............... 473/221 |
| 6,254,492 B1 * | 7/2001 | Taggett ...................... 473/219 |
| 6,514,081 B1 * | 2/2003 | Mengoli .................... 434/252 |
| 6,537,076 B2 | 3/2003 | McNitt et al. | |
| 6,567,536 B2 | 5/2003 | McNitt et al. | |
| 2001/0029207 A1 * | 10/2001 | Cameron et al. ........... 473/151 |
| 2002/0187860 A1 | 12/2002 | Shoane | |
| 2003/0054898 A1 | 3/2003 | Otten | |
| 2003/0103684 A1 * | 6/2003 | Gobush et al. ............. 382/286 |
| 2003/0195052 A1 * | 10/2003 | Cohen et al. .............. 473/151 |
| 2004/0032970 A1 * | 2/2004 | Kiraly ....................... 382/103 |

\* cited by examiner

*Primary Examiner*—Ishrat Sherali
*Assistant Examiner*—Hadi Akhavannik

(57) ABSTRACT

The analysis tool is a system and method for providing athletic training and instruction as it pertains to a golf club swing motion, specially a golf putting stroke motion. The analysis tool provides analysis information to a user from the analysis of at least one video image recording device. The motion of the golf club during the swing or stroke is determined by processing the video image frame data collected by the video image recording device(s). The resulting measurements are displayed by the computer processing environment and presented to the user numerically or pictorially for the purposes of instruction and improvement.

7 Claims, 9 Drawing Sheets

Functional components

Video Capture Process

Automatic Trigger Process

Detection Process

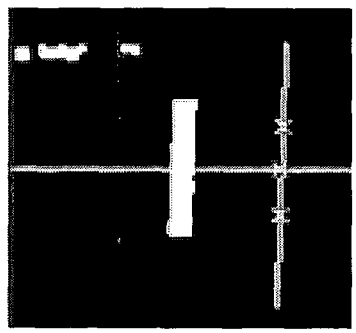
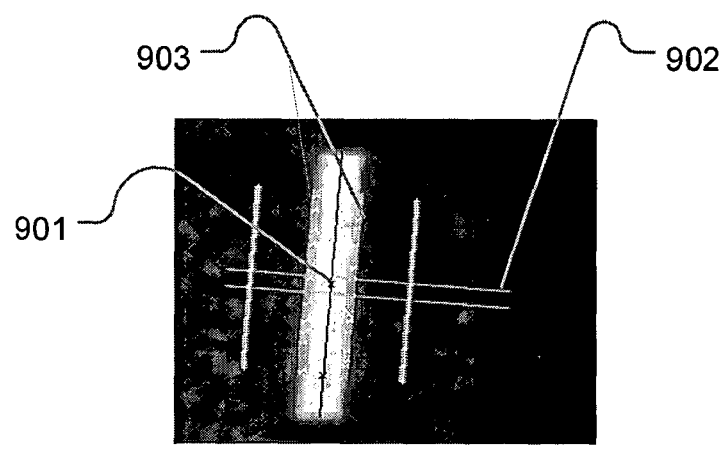
FIG. 8      FIG. 9
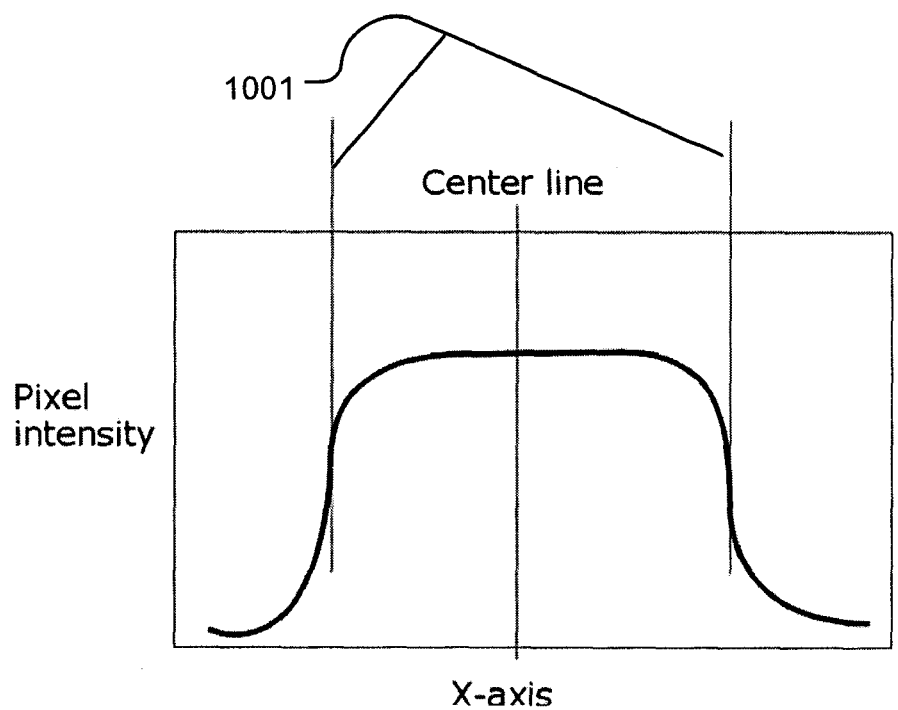
FIG. 10

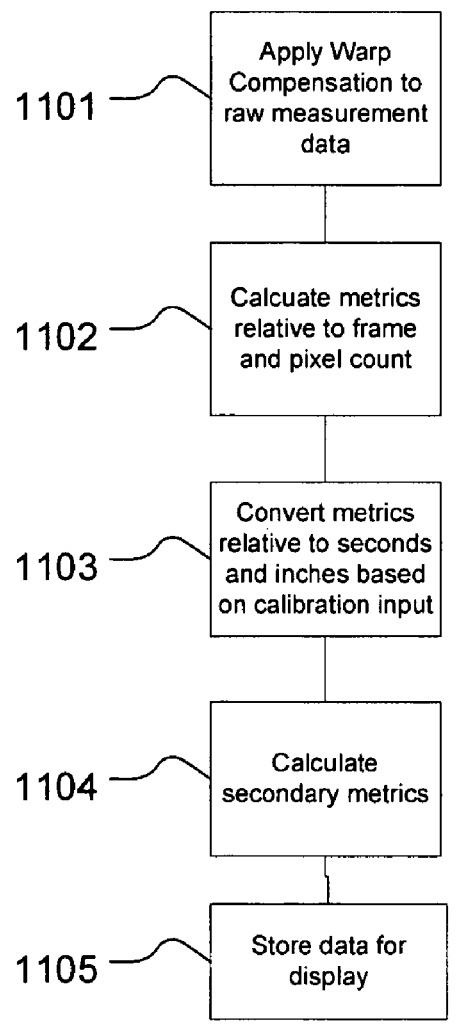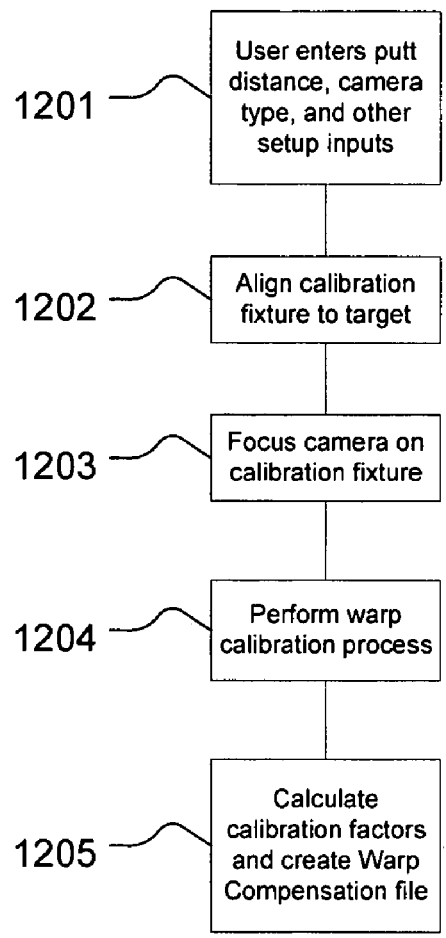
Analysis Process
FIG. 11
Calibration Process
FIG. 12

METHOD AND SYSTEM FOR PHYSICAL MOTION ANALYSIS AND TRAINING OF A GOLF CLUB SWING MOTION USING IMAGE ANALYSIS TECHNIQUES

CROSS REFERENCES TO RELATED APPLICATIONS

Not applicable

FEDERALLY SPONSORED RESEARCH

Not applicable

SEQUENCE LISTING OR PROGRAM

Not applicable

TECHNICAL FIELD

The invention relates generally to a method and system for providing physical motion training using image analysis techniques. More particularly, the invention relates to a computer-implemented analysis tool for providing athletic training and instruction for the golf swing motion, specifically a putter stroke motion.

BACKGROUND OF THE INVENTION

Video and computer motion analysis systems are currently used in all areas of sports training. The golf industry has adopted the use of these systems for the purpose of instructing students to improve their technique of swinging a golf club. Some of these training systems utilize video cameras to capture the golf swing for purposes of slow motion playback. Other systems use complicated and expensive motion sensors which are attached to the body of the student to measure the motion of the student during the golf swing. These more complex systems are superior to video only systems as they present the student with objective measurement data, not just the subjective assessment of the instructor. Although these technologies have proven very useful, they have significant disadvantages and have not been applied for the purpose of correcting the golf putting stroke.

In a golf match, as many or more strokes are taken on the green as are taken in the fairway or around the green. Improvement in a golfer's putting stroke is just as important as improvement in their full swing technique in the attempt to minimize their golf score. Although video and motion analysis systems have proven to be very beneficial for improving a golfer's full swing, they have not been successfully applied to improve the putting stroke. As with the full golf swing, the parameters that define an ideal putting stroke are virtually impossible to detect with the naked eye. Furthermore, teaching systems that rely exclusively on video recording and playback offer no method for detecting or measuring these parameters. More advanced computer teaching systems include sensors to measure the student's motion and may be able to detect some factors that define the ideal putting stroke. However, these sensors must be attached to the student's body and would tend to adversely affect the putting stroke. Furthermore, sensors attached to the student's body can not measure the motion of the putter head itself during the putting stroke. Objective measurement of the putter head during the stroke motion is crucial in the process of instructing and improving the putter stroke. The sensors used in typical teaching systems are magnetic based. These sensors can not be attached to a metal putter without having the measurement from the sensor be adversely affected by the metal induced change of the local magnetic field. Magnetic based sensors, such as the Fastrak or IsoTrak systems manufactured by Polhemus can not be used in close proximity with metal objects.

For any teaching system that uses motion capture and analysis, it is essential the teaching system is configured and aligned properly. If the reference coordinate system of the teaching system is not aligned with physical, ideal ball trajectory, all measurements will include an error offset. Teaching systems used today do not offer adequate methods and alignment fixtures to facilitate precise system alignment to the target.

Consequently, computer systems that are available and designed for instruction and improvement of the full swing golf motion are not adequate for the instruction and improvement of the golf putting stroke. Existing systems can record video of the student's motion and objectively measure the motion of the student's body during the swing motion. They are not adequate for the purpose improving the putting stroke as they are not able to accurately measure the motion of the putter head during the putting stroke.

Furthermore, a golf putter has several physical characteristics that can be specified for purposes of improving a golfer's putting stroke. These include, but not limited to, the shaft length, head weight, head face angle, and head offset. The proper combination of these characteristics in the selection and adjustment of the putter is very useful in the attempt to optimize the golfer's putting stroke. An objective measurement of a putting stroke motion while altering these various characteristics would be extremely useful in the process of customizing a putter to enhance putting performance.

Although this invention is designed primarily for measuring and correcting the putting stroke, in an alternate version, the analysis tool can be used for measuring and analyzing a swing motion performed using other types of golf clubs such as a sand wedge or pitching wedge.

It is with respect to these and other considerations that the present invention has been made.

SUMMARY OF THE INVENTION

In accordance with the present invention, the above and other problems are solved by an analysis tool that uses video image recording devices and processing that facilitates the accurate measurement of a golf club during a swing motion, specifically a golf putter during a putting stroke. The analysis tool incorporates a computer processing environment and one or more video image recording devices. The computer processing environment includes a detection module that employs novel digital image processing algorithms to detect the putter head in each recorded video frame by searching for a light reflective element of certain size and shape placed on a surface of the putter. The computer processing environment also includes an analysis module that determines and calculates various attributes of the putter head motion by using digital image processing algorithms from information passed to it by the detection module. The computer processing environment includes a calibration module that takes into consideration distortion caused by the optical lens, physical misalignment, and other physical properties of the video image recording device. The information produced by the calibration module is used by the analysis module to accurately calculate the various attributes of the putter head motion. Resulting measurements and calculations describing the putter head motion are displayed by the computer processing environment. The displayed information is used for improving the student's putting stroke. Furthermore, the processing environment includes a multiple session display feature. This feature displays putter stroke data and statistics for multiple putting sessions. A session consists of data measured and calculated for one or more putting strokes. This is useful for a student that is testing golf putters of different designs or testing the effectiveness of different putting techniques. The student can define a session for each putter or technique being tested and objectively compare the statistical results for each. In an alternative embodiment, the analysis tool can be used for instruction and comparison using other types of golf clubs, a pitching wedge or sand wedge as examples.

The processing environment includes an automatic trigger module to detect when the putter head has struck the golf ball. The trigger module processes video image data in real time to detect the ball motion then automatically launches the aforementioned digital image processing algorithms, specifically the detection module algorithms. Subsequently, the trigger module requires no external hardware to perform its function.

In accordance with another aspect of the invention, the teaching system includes a novel method and calibration fixture to align the analysis tool to a physical, ideal ball trajectory across a putting surface to a target zone. Furthermore, the calibration fixture provides a visual calibration target used by the calibration module to measure and compensate for distortion caused by the camera lens, misalignment of the camera, and other physical properties of the system setup The invention may be implemented as a computer process, a computing system or as an article of manufacture such as a computer program product or computer readable media. The computer program product may be a computer storage media readable by a computer system containing computer readable instructions for executing a computer process. The computer program product may also be a propagated signal readable by a computing system and encoding a computer program of instructions for executing a computer process, transmitted on a carrier.

These and various other features as well as advantages, which characterize the present invention, will be apparent from a reading of the following detailed description and a review of the associated drawings.

BRIEF DESCRIPTION OF THE DRAWINGS

FIG. 8 is a reproduction of a typical binary image of the region of interest created and used during the detection process shown in FIG. 7.

FIG. 9 is a reproduction of a typical gray scale image of the region of interest created and used during the detection process shown in FIG. 7.

FIG. 10 is a diagram showing feature edge determination during the detection process shown in FIG. 7.

FIG. 11 is a flow diagram of the analysis process of the analysis module as part of the analysis tool shown in FIG. 2.

FIG. 12 is a flow diagram of the calibration process of the calibration module as part of the analysis tool shown in FIG. 2.

DETAILED DESCRIPTION OF THE INVENTION

Figure 1:
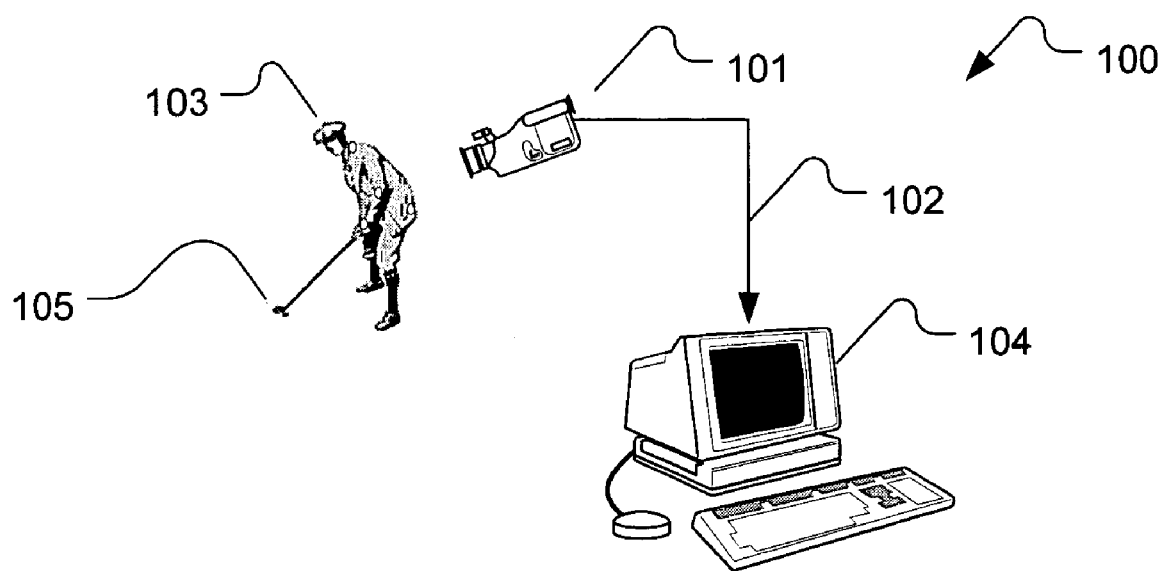
FIG. 1 shows the functional diagram and major physical components of an analysis tool.

An analysis tool 100 used to provide video image data of the subject motion is shown in FIG. 1. Video image data of a golf putter stroke is recorded by at least one video image recording device 101. This video image data is processed by various processing modules, as described in detail below, to determine and calculate the static and dynamic characteristics of the putter head motion during a putting stroke. In accordance with the preferred embodiment, analysis results are presented to provide a person performing the putting motion with correction and instruction to improve the putting stroke or, as an objective measurement to help determine the optimum combination of the various putter physical characteristics to aid in the selection of a putter golf club. In an alternative embodiment, the analysis tool can be used for purposes of instruction with other types of golf clubs, such as a sand wedge or pitching wedge.

Analysis tool 100 uses at least one video image recording device 101 to record a physical motion of a student 103 and to transmit video image data, in the form of a signal comprised of a sequence of frames, 102 to a computer processing environment 104. In the preferred embodiment, the video image recording device is a single analog, 60 fields/second (one field per frame of data), interlaced, black and white video camera with a composite video output (Panasonic model number WV-BP554). In an alternative embodiment, the video image recording device may be a video camcorder, digital video camera, or similar type of video recording equipment. In the preferred embodiment, the computer processing environment is a personal computer with a 2.0 GHz microprocessor, Windows XP Pro operating system, and, LCD flat panel display. The personal computer also contains a video capture device (Cyberoptics Semiconductor Model PXC200AL) to digitize the video image data transmitted by the camera. In an alternative embodiment, the video capture device may be a IEEE 1394 digital capture device or a capture device attached to the USB port of the personal computer, as typical examples. The computer process environment 104 includes a video capture module, a detection module, a analysis module, a calibration module, and a display module used generally to generate analysis and teaching information for improving the student's putting motion or for other reasons. The detection module makes use of a light reflective element 105 attached to a surface of the putter (as described in more detail in a later section). In the preferred embodiment, the various modules are implemented using Visual Basic, C++, and PHP programming languages.

Basic Functional Operation

Figure 2:
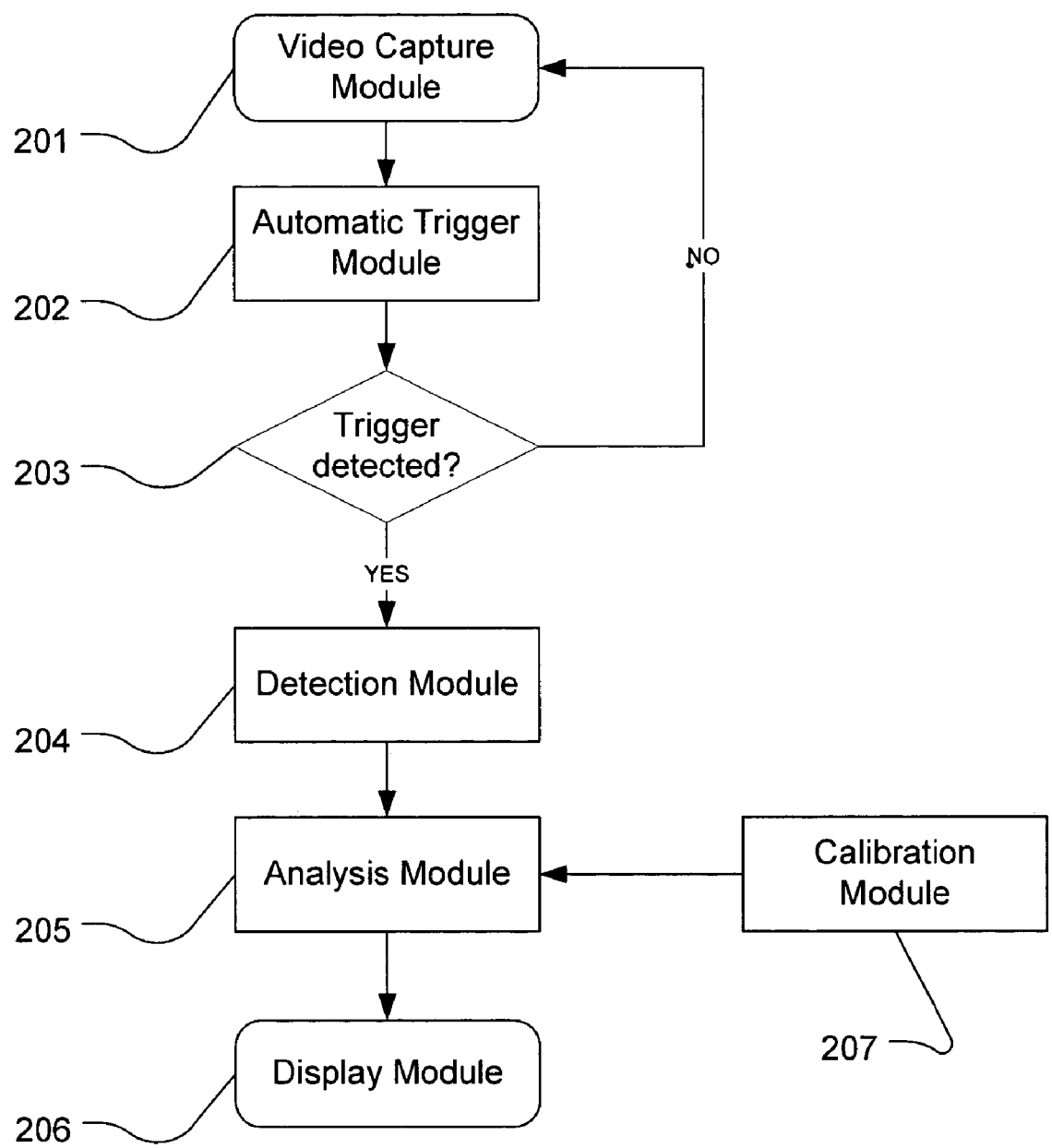
FIG. 2 is a simplified block diagram that illustrates functional components of the analysis tool shown in FIG. 1.

FIG. 2 displays a simplified illustration of the functional components of an analysis tool shown in FIG. 1. Generally, the video capture module 201 continuously collects video image-data from the video image recording devices and saves each frame of data into a circular memory buffer until the automatic trigger module 202 has sensed a trigger event 203. Sample trigger events include golf ball movement, as described in more detail below. Upon detection of the trigger event, the detection module 204 begins processing each frame of video image data saved in the buffer to detect and measure the position of the light reflective element securely attached to the surface of the putter, and therefore, the putter itself. The analysis module 205 uses the processed output from the detection module 204 to determine and calculate static and dynamic characteristics of the putter motion. Furthermore, the analysis module 205 uses input from the calibration module 207 to correct for various physical conditions such as camera lens distortion, camera angle, camera misalignment, zoom factor, etc. The display module 206 displays the corrected static and dynamic measurements and calculations for. Display is accomplished by use of a display device such as a computer monitor, CRT, TV, computer printer, etc.

Detailed Functional Operation-Calibration

Figure 15:
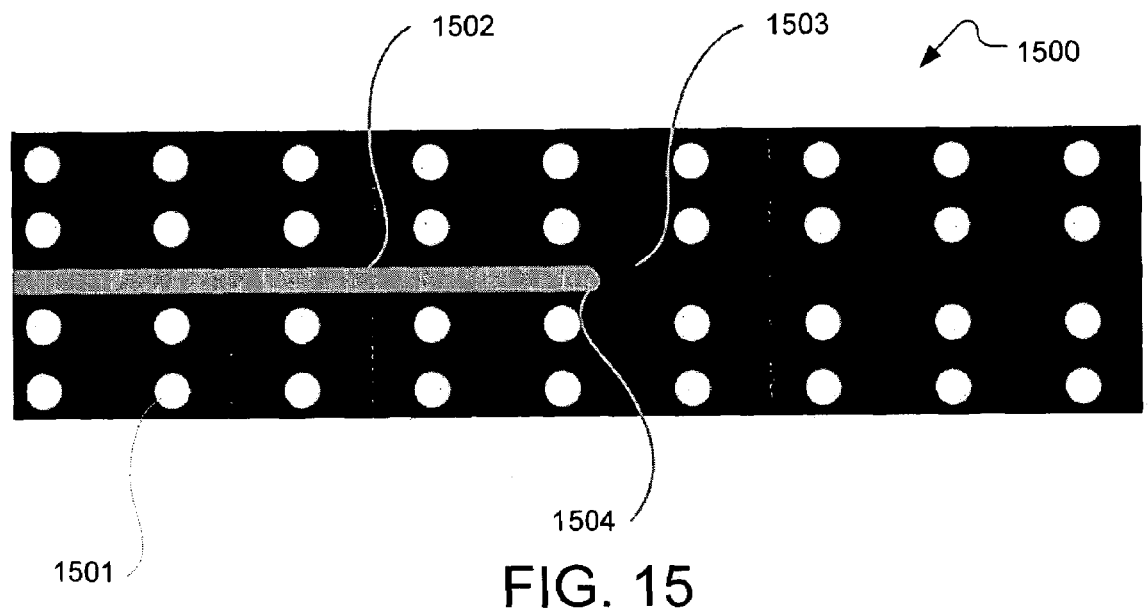
FIG. 15 is a picture of an alignment fixture used to align and calibrate the analysis tool shown in FIG. 1.

Calibration of the analysis tool (as shown in FIG. 1) is required to achieve optimum accuracy and is performed before a student makes a putting stroke. The calibration process is shown in FIG. 12. The calibration process substantially reduces error caused by such factors as camera lens distortion, camera angle, camera misalignment, zoom factor, etc. In step 1201, the user is required to select or enter specific environmental factors which may include distance to a target zone, height of the player, camera zoom factor and other video recording parameters such as height from the floor. In the preferred embodiment, these inputs are the distance to the target zone or hole in the green and the student's height. A special calibration fixture is used for step 1202. The calibration fixture, as shown in FIG. 15, is used to aid in the alignment and calibration of the analysis tool. The calibration fixture 1500 is constructed with a slot 1502 cut as shown in FIG. 15. In the preferred embodiment, the calibration fixture is constructed of ⅛ inch thick black plastic material with a ½" wide slot extending from one edge of the fixture to the center. Alternatively, the fixture may be constructed of another sufficiently rigid material such as metal or cardboard with a guiding feature comprised of an edge to guide a golf ball as it rolls along the fixture such as a ledge or ridge. Furthermore, the fixture contains a small hole at each of the four corners to "pin" the fixture to the putting surface if necessary. The upward facing surface of the calibration fixture is covered with a uniform pattern of features, the calibration target. In a preferred embodiment, the features are circular, white in color, and are ¾ inch in diameter 1501. Alternately, the features may be a different shape, such as a square or "T" shape, and black in color. Each dot in the calibration target has a location specified as an X and Y coordinate with the origin point (0,0) 1503 being at the geometric center of the fixture as shown in FIG. 15. The coordinate location (x, y) for each dot is contained in a calibration setup file as part of the processing environment 104 in FIG. 1.

As shown as step 1202 in FIG. 12, the calibration fixture is placed on the putting surface and visually aligned so the slot points approximately towards the target zone. The target zone may be either a hole or a mark placed on the putting surface. A golf ball is placed into the back of the slot 1504 (FIG. 15) in the calibration fixture and struck with the putter so the ball rolls along the slot. The slot consistently guides the ball as it rolls along the putting surface towards the target regardless of the putter face angle at impact. Based on the final resting position of the ball after being struck, the user can reposition the calibration fixture until the slot defines the exact trajectory the ball must roll along to reach the target zone.

When calibration fixture is aligned as such, step 1203 in the calibration process (as shown in FIG. 12) is to focus the video recording device on the calibration target (on the surface of the calibration fixture). The zoom setting of the recording device should be adjusted such that the calibration target approximately fills the field of view as shown on the computer display. However, an exact zoom factor or alignment position is not required. After the video recording device has been positioned as such, a warp calibration process 1204 is initiated by clicking a button on the main screen of the computer display. A video image of the calibration target is recorded and stored within the computer processing environment. The recorded image is analyzed such that the centroid of each element in the calibration target pattern is determined. In the preferred embodiment, this is done with an algorithm that measures the intensity of each pixel in the area near the expected local of each element in the calibration target. The expected position of each element is specified in the aforementioned calibration setup file. All contiguous pixels in the area above a certain intensity threshold (a constant specified in the calibration setup file and optimized experimentally) are determined to be part of a single element. The pixel at the geometric center of any particular element is selected as the centroid location for that element. Each centroid is assigned an x, y position (with 0, 0 being the upper left pixel of the video display window). Each measured element centroid position is compared to a reference position written in the aforementioned calibration setup file. In step 1205, the positional error for each element is computed and saved to a warp compensation table file. The table is comprised the a X,Y positional error for each feature in the calibration target pattern as a function of the measured centroid position. Furthermore, the ratio of image pixels to inches is computed and stored in the aforementioned warp compensation table file. This is calculated by dividing the known (not measured) distance between two features by the number of measured pixels between the centroids of the same two features. The information stored in the warp compensation table file is used by the analysis module in the analysis process (FIG. 11) to correct and compensate for video recording device inaccuracies such as alignment, zoom factor, and lens distortion. The calibration process effectively aligns the analysis tool with the trajectory the ball must roll along to successfully reach the target zone without requiring precise physical alignment of any video recording device.

Detailed Functional Operation-Video Capture

Figure 3:
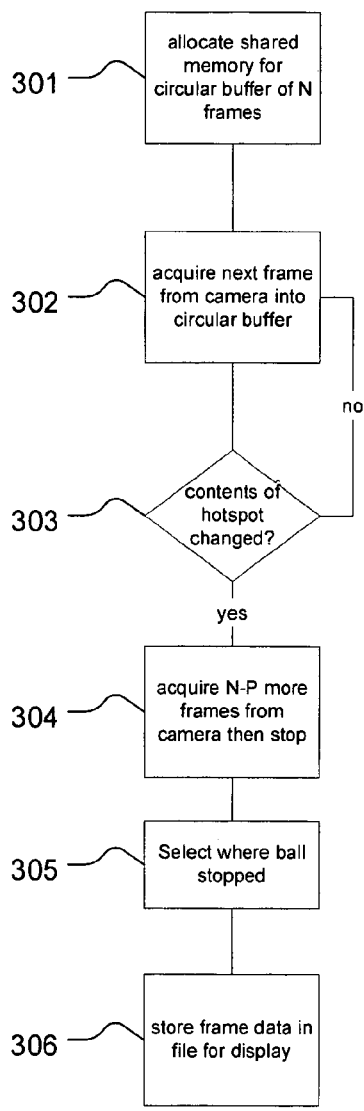
FIG. 3 is a flow diagram of the video capture process of the video capture module as part of the analysis tool shown in FIG. 2.

The video capture process of the video capture module, as shown in FIG. 3, captures data from at least one video recording device transmitting a video feed signal carrying video frame samples defining image information. In the preferred embodiment, this recording device is an analog, 60 fields/second, interlaced, black and white video camera with a composite video output. In steps 301, 302, and 303, computer processing memory is allocated for a circular frame buffer of size N frames. Video frame data is continuously transmitted and saved into the circular frame buffer. The number of frames, N, is defined in the aforementioned configuration setup file and is generally set large enough to capture the complete putting motion. In step 304, upon the detection of the trigger event (as discussed below), the capture module continues to collect video frames until the circular frame buffer is full. In step 305, the computer display presents the user with an option of selecting one of several final resting positions for the ball (ie, in the target zone, long/left, short/right, etc.). This selection is saved by the video capture process (discussed in detail below). In step 306, the image data is stored to be displayed sequentially for purposes of instruction. Information is stored as computer data files or fields in a database as part of the computer processing environment.

Detailed Functional Operation-Automatic Trigger

Figure 4:
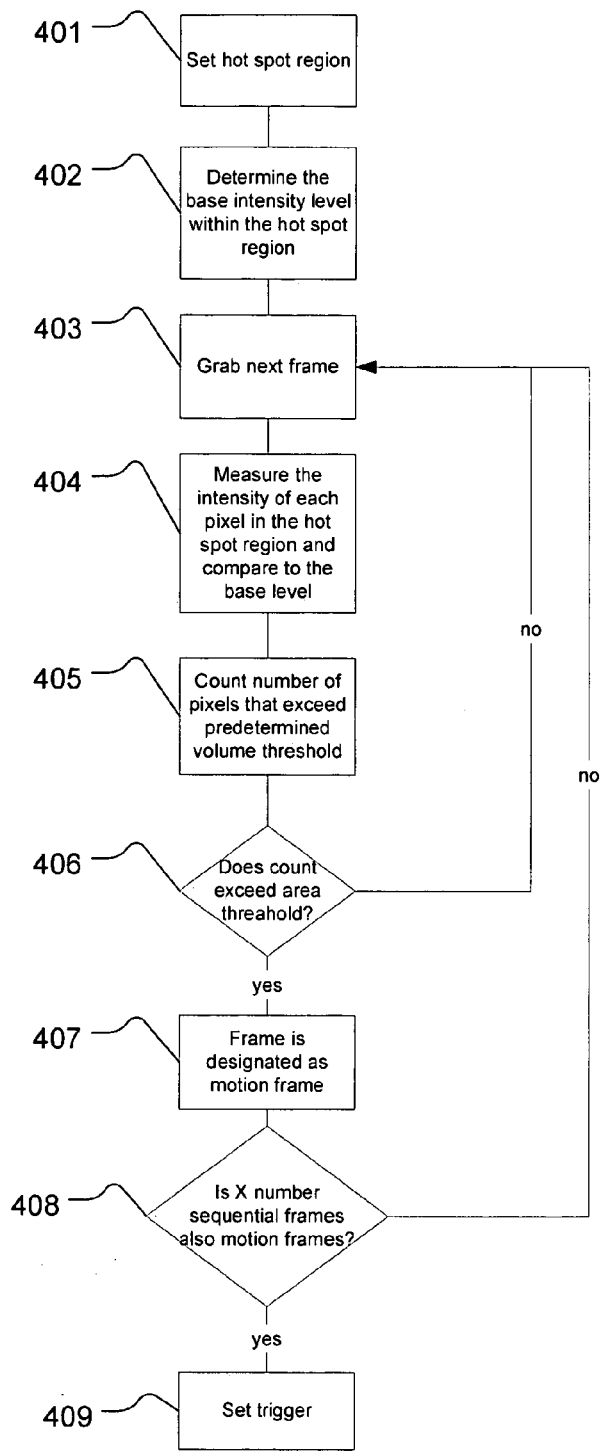
FIG. 4 is a flow diagram of the automatic trigger process of the automatic trigger module as part of the analysis tool shown in FIG. 2.
Figure 5:
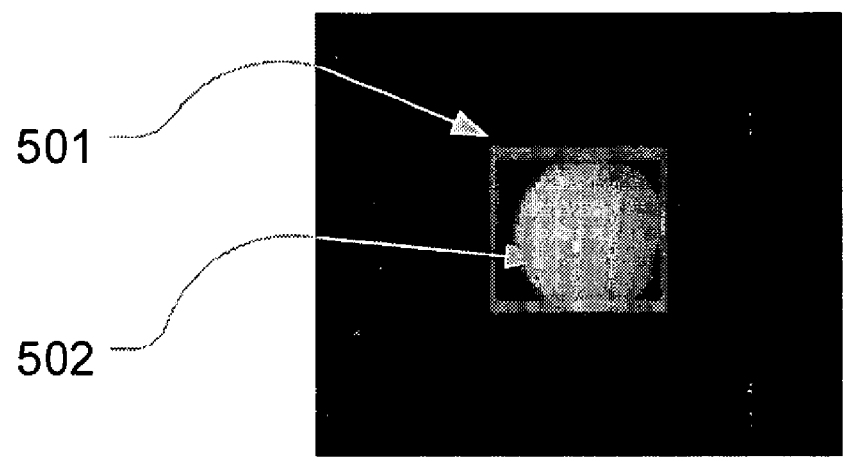
FIG. 5 is a reproduction of a typical hot spot zone selected by the user for purposes of automatically triggering the system.
Figure 6:
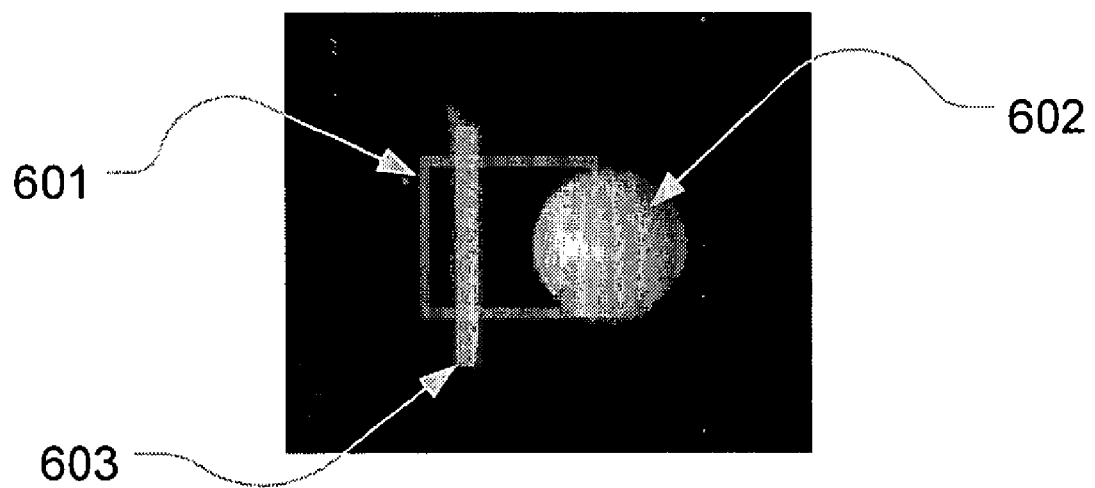
FIG. 6 is a reproduction of a typical hot spot zone selected by the user showing the video frame at the trigger time.

The real-time, automatic trigger process of the automatic trigger module is shown in FIG. 4. A trigger event is defined by a specific change, as explained below, in the video image data of a predetermined hot spot region within the video frame. In step 401, accordance with the preferred embodiment, the predetermined "hot spot" region is defined as a rectangular area (X pixels wide by Y pixels tall) that encloses the image of the golf ball and can be easily set by the user by drawing a box around the image of the golf ball presented on the display screen (using the computer mouse). A typical hot spot region setting as seen on the computer display is shown in FIG. 5. The hot spot region 501 drawn by the user completely encloses the golf ball 502. In step 402 (FIG. 4), as each new frame of image data is transmitted to the circular memory buffer, the base intensity of the image area enclosed in the hot spot region is calculated. The calculation is accomplished by averaging the intensity level of all pixels contained in the hot spot region for the first four successive incoming video frames. In steps 403 through 407, the intensity level of each pixel contained in the hot-spot region for the next successive video frame is measured and compared to the base level. The number of pixels that exceed the base level by a predetermined intensity threshold parameter (a constant value specified in the setup configuration file and optimized experimentally) are counted. If this pixel counts exceeds the volume threshold parameter (a constant value specified in the setup configuration file and optimized experimentally), then the frame is designated a motion frame. In step 408, the next frame of video image data is processed in the same fashion, and so on. When the number of successive frames designated as motion frames equals the motion frame count threshold value (a constant value specified in the setup configuration file and optimized experimentally), the process trigger is enabled as shown in step 409. In the present embodiment, the intensity threshold parameter is 80 bits, the volume threshold is 10%, and the motion frame count threshold value is 1. Alternative embodiments may vary these values. A typical hot spot region at the point of trigger is shown in FIG. 6. The putter head 603 has made contact with the golf ball 602 such that it begins to move outside the hot spot region 601, thereby causing the necessary change in video image data to enable the trigger.

Detailed Functional Operation-Detection

Figure 7:
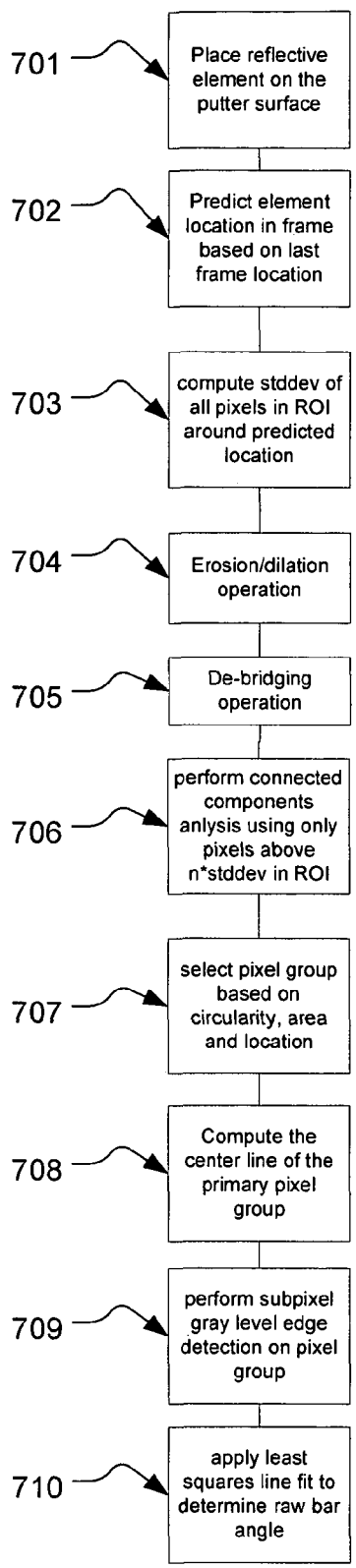
FIG. 7 is a flow diagram of the detection process of the detection module as part of the analysis tool shown in FIG. 2.
Figure 16:
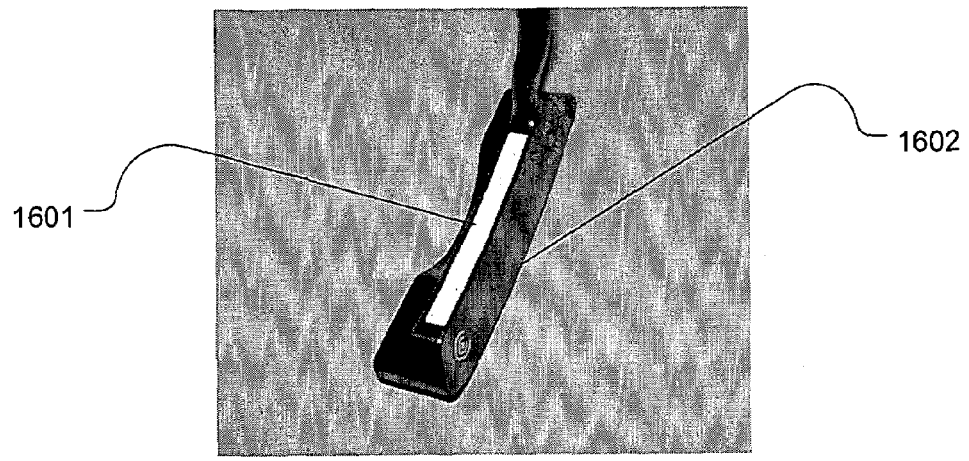
FIG. 16 is a picture of a golf putter showing an attached light reflective element to be used by the analysis tool shown in FIG. 1.

The detection process of the detection module is shown in FIG. 7. In step 701, a light reflective element is placed on a surface of the putter. In the preferred embodiment, as shown in FIG. 16, element 1601 is rectangular shaped with a reflective white surface and placed on the upward facing surface of the putter head 1602. Alternative embodiments may use square or triangular shapes and colors other than white, and placed at other locations on the putter, as examples. Video images of the reflective element, recorded during the putting stroke, are used to determine the precise position of the putter in each successive frame of video information. These images are later referred to as original gray images.

In step 702 of the detection process (FIG. 7), the position of the reflective element is predicted based on its position in the preceding video image (or from the center of the hot spot zone as shown in FIG. 5 for the initial frame). The prediction is a distance X (X is initially a negative value because the putter head must move in the negative X direction during a backstroke) pixels from the previous position, where X is a constant value specified in the aforementioned setup configuration file and optimized experimentally. In accordance with the preferred embodiment, a region of interest (ROI) is defined around the predicted location of the reflective bar such that the entire bar is enclosed by the region (the region is a rectangle where width and height are specified in the configuration file and optimized experimentally based on the typical dimensions of a putter head). In step 703, a standard deviation and mean pixel intensity is calculated for the intensity of every pixel contained in the ROI. All pixels that exceed a certain threshold (3 standard deviations from the mean intensity in accordance with the preferred embodiment) are set to a pixel value of white (255, with black being a value of 0). A second standard deviation and mean pixel intensity is calculated on the resulting image. Pixels that have an intensity value above a certain threshold (4 standard deviations from the mean intensity in accordance with the preferred embodiment) are set to white (255) and those below are set to black (0).

In step 704, an erosion/dilation operation is preformed on the resulting binary image. In the preferred embodiment, the erosion portion of the operation is performed by setting all white pixels that are adjacent (any of four directions) to any black pixel to black (0). The dilation portion of the operation is performed by changing all black pixels that are adjacent (any of four directions) to any white pixel to white (255). In alternative embodiments, this operation may be performed on pixels that meet intensity criteria for adjacent pixels in more than just one direction. This results in a processed binary image similar to the one shown in FIG. 8. Processing the image pixels contained within the ROI, as described above, allows for the pixels representing the reflective element to be more easily differentiated from other pixels in the ROI.

As show in FIG. 7, step 705 of the detection process is a de-bridging operation. This operation is performed on the processed binary image from step 704. A de-bridging threshold is determined as follows:

Threshold=(mean pixel intensity value−C)*standard deviation of pixel intensities; where C is a specified constant in the setup configuration file (optimized experimentally) and the mean pixel value and standard deviation are calculated for all pixels contained in the ROI. All pixels with an intensity value below this threshold are set to black (0). This step is necessary to reduce any undesirable reflection from the metal surfaces of the putter head. These reflections can tend to disrupt the shape of the reflective element in the processed binary image. Using the resulting binary image from step 705 as a digital filter mask, a connected components analysis is performed (step 706) on the original gray scale image of the ROI. The intensity value of each pixel exposed by the filter mask (where the pixel of the mask is white (255)) is compared to a reference threshold stored in the aforementioned set configuration file (a constant that is optimized experimentally). Each pixel that exceeds this threshold is assigned to a group containing other adjacent pixels that also exceed the threshold. This results in one or more separate pixel groups. In step 707, each pixel group is assigned a "significance" factor (SF) based on a calculated circularity, location, and area for that group as defined below:

Circularity Area/(either maximum of height ($h$) or width ($w$) dimension of group)

Location=distance from projected (expected) location

Area=max height of the group*max width of the group

Significance=((1.0−Circularity)$^2$/Location)*Area

The pixel group that is assigned the lowest SF is determined to be the primary pixel group that represents the reflective element attached to the putter. In step 708, the center line of the primary pixel group (along the longest dimension of the group) is determined by computing a least squares line fit of all pixels in the group in the direction of the longest dimension (the result can be seen as 901 in FIG. 9). The raw position coordinates (X and Y) of the putter head is determined to be the geometric center of this primary pixel group. Furthermore, the location of the geometric center of the pixel group is determined as X and Y pixel values from a reference origin. This point is defined as the position of the reflective element, and therefore the putter, in each frame of stored video image data.

In step 709, using the computed center line and the binary image of this selected pixel group from step 707 as a filter mask image, a sub-pixel, gray level edge analysis is performed to precisely determine the angle of the attached reflective element in each frame of recorded video image data. In this process, each original gray scale image is cropped, aligned and combined with its respective filter mask image, and zoomed using a standard bi-linear interpolation method (in the preferred embodiment of this invention a scaling factor of 4× is used) as shown in FIG. 9. Every resulting image is divided into several slices. The width of each slice is a constant value stored in the aforementioned setup configuration file and optimized by experimentation and is generally between 2 and 10 pixels. The algorithm then selects each slice in turn starting at the geometric center of the pixel group. The edges 903 of any selected slice are determined to be at the point of greatest change in pixel intensity (of only the pixels contained in the slice) as shown in FIG. 10, 1001. FIG. 10 represents a typical cross section view of a slice showing pixel intensities along the length of the slice. Each slice in every recorded video image is processed in this manner.

In step 710, a classical robust least square line fit operation is performed for all the edge points (both sides of the pixel group) determined for each slice of-The image. A leading and trailing edge line are determined. The angle of the leading and trailing edge lines are computed and averaged. The resulting angle is stored as the raw putter head angle for that particular image frame. As discussed previously, the raw position coordinates (X and Y) of the putter head is determined to be the geometric center of the primary pixel group. In the analysis process, the raw putter head angle and position will be converted into a final angle and position by using information stored in the aforementioned warp compensation table file from the calibration process (performed and described earlier).

Detailed Functional Operation-Analysis

The analysis process performed by the analysis module is shown in FIG. 11. In step 1101, the information stored in the aforementioned warp compensation table file (the result of the calibration process in FIG. 12) is applied to the raw putter head position as determined from the detection process. As previously discussed, the warp compensation table file is used to compensate and correct for inaccuracies in video recording device placement, alignment, zoom factor, and lens distortion. The warp compensation table contains an X and Y position error for each measured position of every element of the aforementioned calibration target. The raw position and angle of the putter head determined in the detection process is corrected by the amount dictated by the warp compensation table as a function of the measured X and Y position. Using the raw, measured position as a table index, the actual position can be computed from the error values stored in the table for any measured position within the video image. Actual positions for measured positions that fall between explicit values contained in the table are interpolated. In the preferred embodiment, a natural neighbor interpolation employing the Delaunay triangular technique is used to calculate the correction values for measured positions that fall between explicit values. In alternative embodiments, an N order polynomial, two dimensional surface fit interpolation method or simple two dimensional linear interpolation can be used.

In step 1102, the corrected positions are converted from "pixel" units to absolute distance units such as inches using the pixel/distance ratio contained in the warp compensation table (as previously discussed). In step 1103, the velocity of the putter head in the X direction (the direction toward the target) is calculated by looking at the calculated position of the putter in 2 successive image frames and dividing the change in position (delta X) by the time between the two frames of data (delta T). Performing this calculation for every successive pair of measurement data results in a putter velocity curve with respect to X position of the putter for the entire putting stroke. Likewise, the acceleration of the putter head is determined by dividing the change in speed by the time between two frames of data. In step 1104 addition secondary motion data is calculated. In the preferred embodiment, the secondary motion data includes stroke tempo, back stroke distance, follow through distance, offline distance, variance from an ideal path. Back stroke distance is the distance along the X axis (the direction toward the target) the putter head moves from the starting position to the top of the stroke or the point where the putter reverses direction to move forward towards the ball. The forward stroke is the distance the putter moves along the X axis from the top of the stroke to the point of impact with the golf ball. Likewise, the follow through distance is the distance along the X axis the putter head moves from the point of ball impact to the point where the putter head stops or reverses direction after striking the ball. The tempo is the time recorded to make the back stroke motion divided by the time recorded to make the forward motion. As discussed previously, the time of impact is precisely known from the automatic trigger process as shown in FIG. 4. The offline distance is defined as the position of the putter in the Y axis (orthogonal to the X axis in the plane of the putting surface) as compared to the ideal ball trajectory ($Y_{actual}-Y_{ideal}$). Each $Y_{ideal}$ and the corresponding X values define a line representing the ideal trajectory the ball must roll along to reach the target zone (as previously determined by the calibration process). The offline distance is calculated for every X position of the putter head during the stroke. A typical putting stroke tends to trace an arc in the plane of the putting surface (where the X axis is the direction to the target). The perfect putting stroke would trace a perfect, continuous arc where every measured point of the putter head would exactly fall on an arc of radius R, where R may vary for each student. Typical putting strokes do not result in every measured point falling on an arc of radius R. The variance from an ideal path is calculated by performing a best fit arc calculation for the measured points of the putting stroke. The absolute distance of each measured point from the calculated ideal arc along the Y axis are summed and divided by the number of measured points and presented as the variance from an ideal stroke.

In step 1105 the corrected measurement and calculated data is stored for display and/or comparison to previously stored reference data by the processing environment. In the preferred embodiment, the data for each putting stroke is saved in an open source mySQL database as part of the aforementioned processing environment. In alternative embodiments, the data may be saved in a human readable or encoded file as part of the processing environment or other standard types of computer storage media such as floppy disk, magnetic tape or compact disk.

Detailed Functional Operation-Display/Sessions

Figure 13:
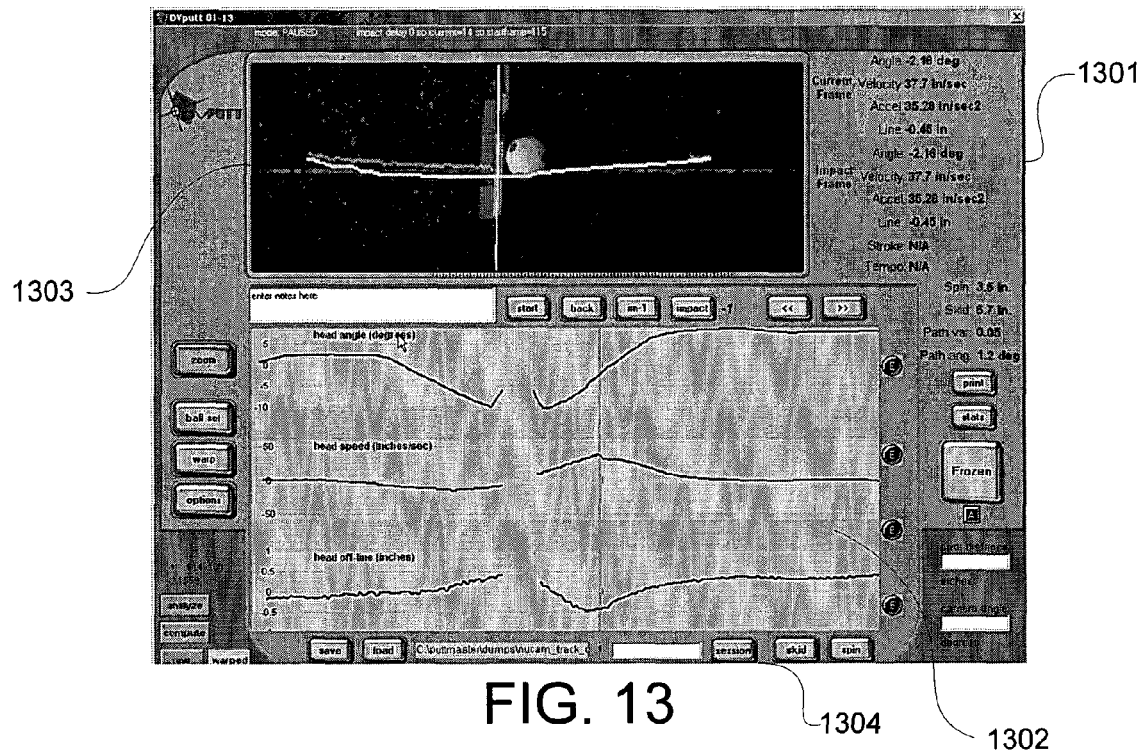
FIG. 13 is a reproduction of a display screen for presenting analysis information from the analysis tool shown in FIG. 1.

The main display screen of the analysis tool 100 (FIG. 1.) is shown in FIG. 13. The stored putting stroke data, as produced by the analysis process, is displayed as numerical output 1301 and graphical output 1302. Similarly, the actual path of the putter head is displayed in a dedicated display area 1303. In the preferred embodiment, the backstroke motion is shown in a different color than the forward motion. In the preferred embodiment, the numerical output display includes putter face angle, head speed (velocity), stroke tempo, back stroke distance, follow through distance, off-line distance and variance from an ideal path for each stroke captured. A future version of the analysis tool may contain more or different output information.

Figure 14:
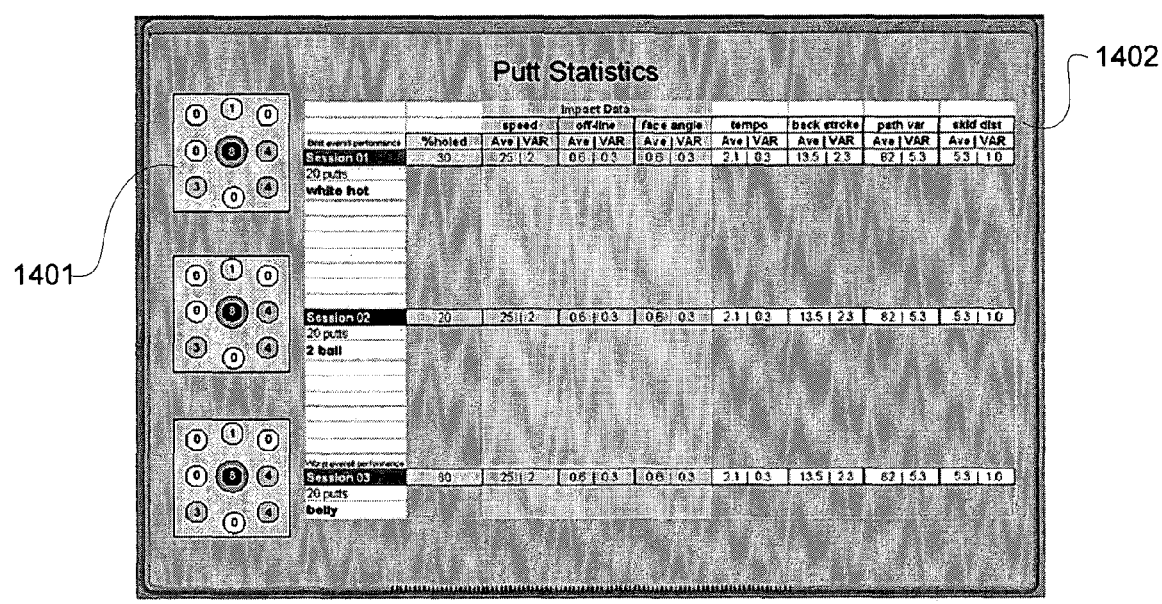
FIG. 14 is a reproduction of a display screen for presenting multiple session analysis information from the analysis tool shown in FIG. 1.

The putter stroke data associated with each putter stroke is stored and linked as a session. The analysis tool allows for a plurality of sessions, each containing one or more sets of putting stroke data. A statistical analysis is performed for all stroke data linked and contained in any given session and presented in the session display screen as shown in FIG. 14. In the preferred embodiment, the statistical analysis data display includes a pictorial, color coded summary of where the ball stopped for each putt 1401 (ie. in the hole, short left, long right, etc.) as determined in step 305 (FIG. 3), of the previously discussed video capture process. A numerical display 1402 shows the calculated mean and standard deviation for putter head speed, off-line distance, and face angle at impact and stroke tempo, back stroke and variance from an ideal path for all strokes linked to any particular session. A future version of the analysis tool may contain more or different types of information. As previously discussed, the analysis tool provides the means for the user to define more than one session. As an example of a typical use, a student may take 20 strokes using putter A where data from the each stroke is linked and stored as session number 1. The student will then advance to the next session by clicking the session button 1304 on the main screen as shown in FIG. 13. Next, the student will take 20 strokes using putter B where data from the each stroke is linked and stored as session number 2. The aforementioned statistical analysis will be performed independently for the data linked and stored in each session and displayed as shown in FIG. 14. In this example, the student is provided with an objective performance measure for each type of putter. Furthermore, as a specific embodiment of the current invention, the analysis tool will visually indicate which session produced the superior measurements. This determination will be a weighted assessment analysis of each of the displayed output parameters contained in the summary for each session as part of the numerical display 1402. The weighting factors for each parameter are constants contained in the setup configuration file and are determined experimentally.

CONCLUSION

From the description above, the advantages of my analysis tool become evident:

(a) The analysis tool precisely measures and calculates various important attributes of the putter head motion which cannot be done with basic video recording systems or analysis systems that employ special sensors.

(b) The anaylsis tool determines the attributes of the putter head motion by analyzing the recorded video image data contained in each frame thereby requiring no additional motion measurement sensors.

(c) The analysis tool provides an automatic trigger process that detects when the golf ball has been struck by the putter then launches the appropriate digital image processing algorithms. This automatic trigger process requires no additional external hardware.

(d) The analysis tool provides a calibration fixture and calibration process for aligning and calibrating the analysis tool to the physical environment of the putter surface and target zone and compensating for distortion caused by the video image recording device. As a key feature, the calibration process results in the alignment of the analysis tool with the trajectory the ball must roll along to successfully reach the target zone without requiring precise physical alignment of the video recording device.

(e) The analysis tool displays statistical analysis values for independently defined sessions containing data for several putting strokes. This analysis is especially useful for objectively comparing different putting techniques or equipment.

(f) Furthermore, in an alternative embodiment, the analysis tool can be used for the measurement and analysis of a swing motion performed using other types of golf clubs such as a sand wedge or pitching wedge.

Although the description above contains many specificities, these should not be construed as limiting the scope of the invention but as merely providing illustrations of some of the presently preferred embodiments of this invention. Although the example of a putting stroke is used throughout the description and is the focus of the invention, the analysis tool can be similarly used for the measurement and analysis of a swing motion performed using other types of golf clubs such as a sand wedge or pitching wedge. Thus, the scope of the invention should be determined by the appended claims and their legal equivalents, rather than by the examples given.

What is claimed is:

1. An analysis tool for capturing and analyzing physical motion of a golf putter during a putting stroke, comprising:
   (a) one or more video image recording devices;
   (b) a computer processing environment for processing and storing video image data recorded by said video image recording devices;
   (c) means for a calibration process to determine an exact trajectory a golf ball must roll along to reach a predetermined target zone and to determine measurement correction factors necessary to compensate for measurement errors caused by optical distortion, misalignment, or positional variance of said individual image recording devices;
   (d) a light reflective element attached to a surface of said golf putter whereby providing a visual target to record using said video recording devices, detect, and measure position and angle of said light reflective element representing said putter, relative to said exact trajectory with respect to time;
   (e) a computer readable media containing computer algorithms operable in said computer processing environment for processing said video image data as recorded from each single said video recording device containing recorded image representations of said light reflective element whereby determining a plurality of said position and angular measurements of said light reflective element relative to said exact trajectory, representing said golf putter to which said light reflective element is attached;
   (f) a display device providing means for presenting said position and angular measurements relative to said exact trajectory;
   (g) means for processing and correcting said position and angular measurements using said calibration correction factors relative to said exact trajectory;

whereby providing corrected, position and angular motion measurement information to aid in instruction and improvement of said putting stroke.

2. The analysis tool as defined in claim 1 further comprising a means for automatically starting a detection and analysis process as part of processing said video image data from an individual said video image recording device based on a predetermined amount of change within a user defined image region of same said video image data from the same individual said video image recording device as a function of time.

3. The analysis tool as defined in claim 1 further comprising a calibration fixture assembly to perform said calibration process, comprising:
   (a) a physical golf ball guide with alignment feature;
   (b) a visual calibration target,
whereby a recorded video image of aligned said visual calibration target is processed to perform said calibration process.

4. The calibration fixture assembly as defined in claim 3 wherein said physical golf ball guide is a groove of sufficient dimensions to physically guide a rolling golf ball to determine the initial direction vector said golf ball must travel along, and therefore said exact trajectory, to successfully reach a specified target zone.

5. The calibration fixture assembly as defined in claim 3 wherein said visual calibration target contains on its surface a uniform pattern of distinct features that can be manually aligned to the said physical golf ball guide alignment feature to facilitate the process of calibrating and aligning said analysis tool to said exact trajectory.

6. The analysis tool as defined in claim 1 wherein said computer readable media containing computer algorithms further comprising a detection process using digital image processing techniques to find a center location and edge boundaries of the representation of said reflective element in each frame of said video image data from a single said video recording device, thereby determining said position and angular measurements of said light reflective element relative to said exact trajectory.

7. The analysis tool as defined in claim 1 further comprising a means to calculate secondary motion data from said position and angular measurements of said light reflective element relative to said exact trajectory. This said secondary motion data is comprised of stroke tempo, back stroke distance, follow through distance, off-line distance, and variance from ideal path.

* * * * *